(12) United States Patent
Milliman et al.

(10) Patent No.: US 11,059,264 B2
(45) Date of Patent: Jul. 13, 2021

(54) MULTILAYER CONSTRAINED-LAYER DAMPING

(71) Applicant: Avery Dennison Corporation, Glendale, CA (US)

(72) Inventors: Henry W. Milliman, Willoughby, OH (US); Mahesh Ganesan, Beachwood, OH (US)

(73) Assignee: Avery Dennison Corporation, Glendale, CA (US)

( * ) Notice: Subject to any disclaimer, the term of this patent is extended or adjusted under 35 U.S.C. 154(b) by 430 days.

(21) Appl. No.: 15/925,150

(22) Filed: Mar. 19, 2018

(65) Prior Publication Data

US 2019/0283362 A1     Sep. 19, 2019

(51) Int. Cl.
| | | |
|---|---|---|
| *B32B 7/02* | (2019.01) | |
| *F16F 9/30* | (2006.01) | |
| *F16F 9/52* | (2006.01) | |
| *B32B 27/30* | (2006.01) | |
| *B32B 27/22* | (2006.01) | |

(52) U.S. Cl.
CPC ............ *B32B 7/02* (2013.01); *B32B 27/22* (2013.01); *B32B 27/306* (2013.01); *B32B 27/308* (2013.01); *F16F 9/306* (2013.01); *F16F 9/52* (2013.01); *B32B 2250/02* (2013.01); *B32B 2262/101* (2013.01); *B32B 2307/536* (2013.01); *B32B 2307/542* (2013.01); *B32B 2307/56* (2013.01); *F16F 2222/02* (2013.01); *F16F 2228/04* (2013.01); *F16F 2230/40* (2013.01)

(58) Field of Classification Search
CPC ...... F16F 2230/40; F16F 2222/02; F16F 9/52; F16F 9/306; F16F 2228/04; B32B 7/02; B32B 7/22; B32B 2307/56; B32B 27/308; B32B 27/306; B32B 2250/02; B32B 2262/101; B32B 2307/536; B32B 2307/542
See application file for complete search history.

(56) References Cited

U.S. PATENT DOCUMENTS

| | | | |
|---|---|---|---|
| 2,819,032 A * | 1/1958 | Detrie | E04B 1/74 244/119 |
| 3,087,571 A | 4/1963 | Kerwin, Jr. | |
| 3,160,549 A * | 12/1964 | Caldwell | E04B 1/84 428/317.3 |
| 3,476,209 A * | 11/1969 | Cohen | E04B 1/86 181/286 |
| 4,340,437 A | 7/1982 | Rogers | |
| 4,447,493 A | 5/1984 | Driscoll et al. | |
| 4,576,850 A | 3/1986 | Martens | |
| 4,742,107 A | 5/1988 | Statz | |
| 4,859,523 A | 8/1989 | Endoh et al. | |
| 5,262,232 A | 11/1993 | Wilfong et al. | |
| 5,356,715 A | 10/1994 | Levine et al. | |
| 5,474,840 A | 12/1995 | Landin | |
| 5,593,759 A | 1/1997 | Vargas et al. | |
| 5,618,859 A | 4/1997 | Maeyama et al. | |
| 5,670,006 A | 9/1997 | Wilfong et al. | |
| 5,851,327 A | 12/1998 | Landin | |
| 6,054,007 A | 4/2000 | Boyd et al. | |
| 6,147,150 A | 11/2000 | Ohira et al. | |
| 6,207,272 B1 | 3/2001 | Takahira et al. | |
| 6,245,419 B1 | 6/2001 | Hakotani et al. | |
| 6,296,979 B1 | 10/2001 | Morita et al. | |
| 6,315,851 B1 | 11/2001 | Mazurek et al. | |
| 6,420,447 B1 | 7/2002 | Kittel et al. | |
| 6,576,316 B2 | 6/2003 | Simons et al. | |
| 6,863,629 B2 | 3/2005 | Falone et al. | |
| 6,953,105 B2 | 10/2005 | Rust et al. | |
| 7,176,258 B2 | 2/2007 | Morihiro et al. | |
| 7,241,837 B2 | 7/2007 | Yaguchi et al. | |
| 7,253,218 B2 | 8/2007 | Hussaini et al. | |
| 7,368,494 B2 | 5/2008 | Morihiro et al. | |
| 7,624,762 B2 | 12/2009 | Cohen et al. | |
| 7,713,604 B2 | 5/2010 | Yang et al. | |
| 7,812,107 B2 | 10/2010 | Numazawa et al. | |
| 7,973,106 B2 | 7/2011 | Fisk et al. | |
| 8,028,800 B2 | 10/2011 | Ravnaas | |
| 8,268,440 B2 | 9/2012 | Takata et al. | |
| 8,562,850 B2 | 10/2013 | Miyawaki et al. | |
| 8,609,763 B2 | 12/2013 | Sugimae et al. | |
| 8,664,286 B2 | 3/2014 | Yasui et al. | |

(Continued)

FOREIGN PATENT DOCUMENTS

| | | |
|---|---|---|
| CN | 101125904 | 2/2008 |
| CN | 101400739 | 4/2009 |

(Continued)

OTHER PUBLICATIONS

Gilleo, Dr. Ken, et al. "Thermoplastic Adhesives—The Attachment Solution for Multichip Modules." IEPS, Sep. 1993, pp. 232-242.
Kinloch, A.J, "Toughening Epoxy Adhesives to Meet Today's Challenges." Materials Research Society Bulletin, vol. 28, 2003, pp. 445-448.
International Search Report and Written Opinion issued in corresponding IA No. PCT/US2018/023119 dated Dec. 21, 2018.
Pattantyus-Abraham et al. "Recent Advances in Nanostructured Biomimetic Dry Adhesives", Front Bioeng Biotechnol, 2013, vol. 1, 22.
International Search Report and Written Opinion issued in corresponding IA No. PCT/US2017/052419 dated Jan. 8, 2018.

(Continued)

*Primary Examiner* — Forrest M Phillips

(57) ABSTRACT

Provided herein is are multilayer damping laminates comprising alternating damping and constraining layers. The materials and configurations of the damping layers are selected such that the damping layers have a decreasing glass transition temperature profile beginning at the first damping layer, allowing the laminates to effectively dissipate vibrations over a wider range of operating temperatures and/or frequencies. Also provided are systems and methods using the multilayer damping laminates.

27 Claims, No Drawings

(56) References Cited

U.S. PATENT DOCUMENTS

| | | | |
|---|---|---|---|
| 8,877,848 B1 | 11/2014 | Wang et al. | |
| 9,080,040 B2 | 7/2015 | Fonseca et al. | |
| 9,186,869 B2 * | 11/2015 | Hauber | B32B 27/308 |
| 9,211,176 B2 | 12/2015 | Natarajan et al. | |
| 9,536,513 B2 | 1/2017 | Wulff et al. | |
| 9,566,722 B2 | 2/2017 | Sitti et al. | |
| 9,626,952 B2 | 4/2017 | Miyawaki et al. | |
| 10,119,589 B2 * | 11/2018 | Schaedler | C25D 7/00 |
| 10,160,404 B2 * | 12/2018 | Miyashita | B29C 33/42 |
| 2007/0088121 A1 | 4/2007 | Miyawaki et al. | |
| 2007/0197713 A1 | 8/2007 | Miyawaki et al. | |
| 2008/0102240 A1 | 5/2008 | Serra et al. | |
| 2008/0251201 A1 | 10/2008 | Sikkel et al. | |
| 2009/0047500 A1 | 2/2009 | Maeda | |
| 2009/0148712 A1 | 6/2009 | Xiao | |
| 2010/0190916 A1 | 7/2010 | Takata et al. | |
| 2011/0060066 A1 | 3/2011 | Yokota et al. | |
| 2012/0085961 A1 | 4/2012 | Rogunova et al. | |
| 2013/0035412 A1 | 2/2013 | Schmitz et al. | |
| 2013/0178558 A1 | 7/2013 | Rousse et al. | |
| 2013/0196105 A1 | 8/2013 | Karlserr | |
| 2014/0061976 A1 | 3/2014 | Doersam et al. | |
| 2014/0363610 A1 | 12/2014 | Sameoto | |
| 2015/0004346 A1 | 1/2015 | Daley | |
| 2015/0004405 A1 | 1/2015 | Clapper et al. | |
| 2015/0183975 A1 | 7/2015 | Clapper et al. | |
| 2015/0218404 A1 | 8/2015 | Bowles et al. | |
| 2016/0017902 A1 | 1/2016 | Castillo et al. | |
| 2016/0264818 A1 | 9/2016 | Peterson | |
| 2017/0240783 A1 | 8/2017 | Bartholomew et al. | |

FOREIGN PATENT DOCUMENTS

| | | | |
|---|---|---|---|
| CN | 101402800 | 4/2009 | |
| CN | 101463167 | 6/2009 | |
| CN | 101463232 | 6/2009 | |
| CN | 102424714 | 4/2012 | |
| CN | 102443332 | 5/2012 | |
| CN | 102492378 | 6/2012 | |
| CN | 102558840 | 7/2012 | |
| CN | 102604239 | 7/2012 | |
| CN | 102952294 | 3/2013 | |
| CN | 102977416 | 3/2013 | |
| CN | 102977482 | 3/2013 | |
| CN | 103013384 | 4/2013 | |
| CN | 103086319 | 5/2013 | |
| CN | 103289137 | 9/2013 | |
| CN | 103387715 | 11/2013 | |
| CN | 103554924 | 2/2014 | |
| CN | 103724908 | 4/2014 | |
| CN | 104004305 | 8/2014 | |
| CN | 104650403 | 5/2015 | |
| CN | 104673009 | 6/2015 | |
| CN | 104693518 | 6/2015 | |
| CN | 104877191 | 9/2015 | |
| CN | 105273245 | 1/2016 | |
| CN | 105315515 | 2/2016 | |
| CN | 105384888 | 3/2016 | |
| CN | 105754235 | 7/2016 | |
| CN | 105936741 | 9/2016 | |
| CN | 106084867 | 11/2016 | |
| CN | 106284913 | 1/2017 | |
| CN | 106543500 | 3/2017 | |
| CN | 106867060 | 4/2017 | |
| CN | 106715558 | 5/2017 | |
| CN | 106866896 | 6/2017 | |
| CN | 106867060 | 6/2017 | |
| EP | 0255332 | 2/1988 | |
| EP | 0335642 | 10/1989 | |
| EP | 405300 | 11/1994 | |
| EP | 728166 | 8/1996 | |
| EP | 0770190 | 7/1999 | |
| EP | 1002008 | 3/2002 | |
| EP | 1658966 | 5/2006 | |
| EP | 1714997 | 10/2006 | |
| EP | 1987089 | 11/2008 | |
| EP | 2164901 | 3/2010 | |
| EP | 279 006 | 12/2011 | |
| EP | 2420412 | 7/2013 | |
| EP | 2922896 | 9/2015 | |
| EP | 3052538 | 8/2016 | |
| EP | 3080175 | 10/2016 | |
| EP | 3089472 | 11/2016 | |
| EP | 3030591 | 6/2017 | |
| EP | 3194483 | 7/2017 | |
| EP | 2464513 | 11/2017 | |
| JP | 05-318644 | 12/1993 | |
| JP | 08-170688 | 7/1996 | |
| JP | 10-503575 | 3/1998 | |
| JP | 2010526916 | 8/2010 | |
| JP | 2013181155 | 9/2013 | |
| JP | 2014109023 | 6/2014 | |
| JP | 2014162810 | 9/2014 | |
| JP | 2014224180 | 12/2014 | |
| JP | 2015160903 | 9/2015 | |
| JP | 2016056279 | 4/2016 | |
| JP | 2016141800 | 8/2016 | |
| JP | 2017039864 | 2/2017 | |
| JP | 2017082171 | 5/2017 | |
| KR | 1020130096623 | 8/2013 | |
| TW | 201004991 | 2/2010 | |
| TW | 201309762 | 3/2013 | |
| TW | 201341475 | 10/2013 | |
| TW | 201602231 | 1/2016 | |
| WO | 03/022568 | 3/2003 | |
| WO | 2012010844 | 1/2012 | |
| WO | WO-2015111786 A1 * | 7/2015 | B32B 27/30 |
| WO | 2016/048780 | 3/2016 | |
| WO | 2016093339 | 6/2016 | |
| WO | 2017094266 | 6/2017 | |
| WO | 2018/057570 | 3/2018 | |
| WO | WO-2018142370 A1 * | 8/2018 | B32B 1/00 |

OTHER PUBLICATIONS

International Preliminary Report on Patentability dated Sep. 22, 2020 issued in corresponding IA No. PCT/US2018/023119 filed Mar. 19, 2018.

International Report on Patentability issued in corresponding IA No. PCT/US2017/052419 dated Apr. 4, 2019.

International Search Report and Written Opinion dated Jul. 25, 2019 issued in corresponding IA No. PCT/US2019/032421 filed May 15, 2019.

International Preliminary Report on Patentability dated Nov. 17, 2020 issued in corresponding IA No. PCT/US2019/032421 filed May 15, 2019.

* cited by examiner

MULTILAYER CONSTRAINED-LAYER DAMPING

FIELD OF THE DISCLOSURE

The present disclosure relates generally to multilayer damping laminates for dissipating vibrations.

BACKGROUND

There is a need in many markets, e.g., the automotive market, the home appliance market, and the electronics market, for the reduction of undesired vibrations and associated noise generation. As an example, the automotive industry is trending towards an increased adoption of lighter weight vehicles. As such, there has been an increased use of lighter weight aluminum and polymer materials. The use of these designs and materials, however, leads to additional issues relating to vehicle vibration and vibration-related noise.

Generally, the noise and vibration issues have been managed through two approaches: the stiffening of the structure geometry to be more resistant to vibration, and the damping of the structure to reduce the vibration amplitude. Along with these solutions, acoustic technologies can be used to absorb, reflect, and isolate sound waves from their source, for example before they reach a passenger in an automotive cabin.

Structural damping approaches can involve the application of damping tapes or laminates that include a stiffening or constraining carrier material and a damping material. The effectiveness of damping tapes in dissipating vibrations can depend on both the frequency of the vibrations to be dissipated, and the temperature of damping tape materials. In particular, conventional damping tapes provide vibration damping over only a relatively narrow temperature range that may not include all standard operating temperatures of the structure to be dampened. As a result, a need remains for damping laminates that effectively and efficiently dampen or reduce vibrations over a wider temperature range.

SUMMARY

In one embodiment, the disclosure is to a multilayer damping laminate having a composite loss factor at about 200 Hz that is greater than about 0.05. In many embodiments, the multilayer damping laminate has a composite loss factor greater than about 0.05 over a temperature range of at least about 30° C. The multilayer damping laminate comprises a first damping layer, an external constraining layer, and a second damping layer, where at least a portion of the second damping layer is disposed between the first damping layer and the external constraining layer. The multilayer damping laminate also comprises an internal constraining layer, at least a portion of which is disposed between the first damping layer and the second damping layer. In many embodiments, the first damping layer comprises a first adhesive, and the second damping layer comprises a second adhesive. In some embodiments, the first damping layer comprises a first viscoelastic damping material, and the second damping layer comprises a second viscoelastic damping material. In many embodiments, the first damping layer comprises an adhesive and the second damping layer also comprises an adhesive. In many embodiments, the first damping layer comprises a pressure sensitive adhesive. In many embodiments, the second damping layer also comprises a pressure sensitive adhesive. In many embodiments, the internal constraining layer and the external constraining layer each independently comprise a metal. In some embodiments, the internal constraining layer and the external constraining layer are each independently a metal foil. The damping layers of the laminate may have a decreasing glass transition temperature profile beginning at the first damping layer. In many embodiments, the glass transition temperature of the first damping layer, i.e., a first glass transition temperature, is at least 5° C. greater than the glass transition temperature of the second damping layer, i.e., a second glass transition temperature. In some embodiments, the difference between the first glass transition temperature and the second glass transition temperature ranges from about 5° C. to about 35° C. In some embodiments, the first and second glass transition temperatures each independently range from about −60° C. to about 100° C. In some embodiments, the damping layers of the laminate may have an increasing plateau modulus profile beginning at the first damping layer. In many embodiments, the damping layers of the laminate may each have a viscoelastic loss factor, wherein the difference between the first viscoelastic loss factor and the second viscoelastic loss factor ranges from about 0.2 to about 1.5 if the difference between the first glass transition temperature and the second glass transition temperature is less than about 20° C., and wherein the difference between the first viscoelastic loss factor and the second viscoelastic loss factor ranges from about 0.2 to about 3.0 if the difference between the first glass transition temperature and the second glass transition temperature is greater than about 20° C. In some embodiments, the damping layers of the laminate may each have a viscoelastic loss factor, wherein the difference between the maximum value of the first viscoelastic loss factor and the maximum value of the second viscoelastic loss factor ranges from about 0.2 to about 1.5 if the difference between the first glass transition temperature and the second glass transition temperature is less than about 20° C., and wherein the difference between the maximum value of the first viscoelastic loss factor and the maximum value of the second viscoelastic loss factor ranges from about 0.2 to about 3.0 if the difference between the first glass transition temperature and the second glass transition temperature is greater than about 20° C. In many embodiments, the first damping layer and the second damping layer each independently have a thickness ranging from about 0.1 mil to about 200 mil. In some embodiments, the internal constraining layer and external constraining layer each independently have a thickness ranging from about 0.2 mil to about 120 mil. In some embodiments, the multilayer damping laminate further comprises a liner layer connected to the first damping layer opposite the second damping layer.

In another embodiment the disclosure relates to a multilayer damping laminate comprising N damping layers, N−1 internal constraining layers, and an external constraining layer, wherein N is an integer greater than or equal to about 2. At least a portion of each damping layer is coextensive with the other damping layers. At least a portion of each $M^{th}$ internal constraining layer is disposed between the $M^{th}$ damping layer and the $(M+1)^{th}$ damping layer, wherein M is an integer ranging from 1 to N−1. At least a portion of the $N^{th}$ damping layer is disposed between the $(N−1)^{th}$ constraining layer and the external constraining layer. The damping layers of the laminate each independently have a glass transition temperature, $T_g$, wherein $T_g(N)<T_g(N-1)<T_g(N-2)< \ldots <T_g(1)$. In many embodiments, the damping layers of the laminate each independently have a plateau modulus $(G_o)$, wherein $G_o(N)>G_o(N-1)>G_o(N-2)>>G_o(1)$.

In another embodiment, the disclosure is to a system comprising a multilayer damping laminate as described above. The system further comprises a base substrate connected to the first damping layer of the multilayer damping laminate.

In another embodiment, the disclosure is to a method of reducing a vibration of a base substrate. The method comprises providing a base substrate that is subject to a vibration. The method further comprises connecting the base substrate to the first damping layer of a provided multilayer damping laminate. In some embodiments, the method further comprises shifting a location of maximum shear strain from the first damping layer to the second damping layer as the temperature of application of the multilayer damping laminate changes from the first glass transition temperature to the second glass transition temperature when measured at a frequency of interest. In many embodiments, the vibration of the base structure is dissipated over a sequential range of temperatures and frequencies.

DETAILED DESCRIPTION

The present disclosure generally relates to multilayer damping laminates that, when attached to a structure subject to a vibration, are advantageously capable of effectively dissipating the vibration over a wide range of temperatures and frequencies. For example, it is beneficial for a damping laminate to reduce undesired vibrations of structures, as these vibrations can decrease the stability of the structure, increase fatigue and stress, shorten an operational lifetime, and promote undesired vibration side effects, such as the generation of noise or the discomfort of vehicle passengers.

Conventionally, damping treatments are applied to such vibrating structures to decrease the occurrence and intensity of the vibrations. Some damping treatments employ constrained layer damping (CLD) constructions that include a layered configuration of a stiffening element and a damping element. These CLD treatments can be effective in mitigating certain vibrational frequencies at particular temperatures determined in part by the choice of damping element materials. As a result, the effective temperature range of a conventional CLD treatment can be relatively limited. It is known that the layered stacking of multiple CLD treatments that use different viscoelastic damping materials in each treatment can be used to broaden the temperature range of damping. However, broadening of damping temperatures in this way detrimentally leads to an undesired decrease in peak damping performance. Furthermore, such stacking of CLD treatments to increase the breadth of damping increases the mass of the treatment product, which is also undesirable.

Disclosed herein are configurations of multilayer CLD treatments using damping materials with particular rheological properties that allow for damping at broad temperatures with increased damping efficiency. The identified rheological properties provide parameters that can be used to select viscoelastic materials that can be arranged in a stacked configuration according to specific design criteria. This allows for the construction of new multilayer damping laminates with differentiated damping layers having different rheological characteristics. These new laminates beneficially exhibit broad temperature damping with minimal, if any, reduction in peak damping and little addition in treatment weight.

The damping performances of a damping laminate and its component damping layers can be described in terms of their respective loss factors. The viscoelastic loss factors of a damping material or damping layer, $\tan(\delta)$, is a measure of its ability to convert vibrational energy to thermal energy. As a general practice, the damping materials or compositions of individual damping layers selected as being highly damping can have viscoelastic loss factors of about 0.5 or larger. In a layered construction, the total loss factor, also referred to as the composite loss factor (CLF), of the overall construction is generally considered effective at values of 0.05 or larger. The composite loss factor varies with both vibrational frequency and temperature, and for a given frequency a curve can be plotted of the composite loss factor versus temperature. The maximum CLF value of this curve can be referred to as the peak damping value, and the abscissa width of the portion of the curve having a CLF greater than about 0.05 can be referred to as the damping temperature range. The damping efficiency of a particular damping treatment at a given vibrational frequency can then be calculated with the equation:

$$\xi = \frac{W \times M}{\rho_A}$$

wherein $\xi$ is the damping efficiency, W is the damping temperature range in °C., M is the peak damping value, and $\rho_A$ is the linear density in kg/m.

When a CLD treatment using a viscoelastic damping material as a damping material is applied to a vibrating substrate where the viscoelastic damping material is an adhesive, the vibrations from the substrate may be transferred to the adhesive in contact with the substrate. In the vicinity of the glass transition regime of the adhesive, assuming that the substrate, adhesive, and constraining layer are coupled such that all three vibrate at similar wavelengths, the vibrations are lost as thermal energy by virtue of molecular motions of the adhesive polymer chains, thereby leading to an energy loss which in turns results in a damping of the amplitudes of vibration. Therefore, in such a construction, vibrational damping is maximal only at temperatures near that of the glass transition temperature of the adhesive. This causes a damping temperature range of the composite loss factor curve that is narrowly positioned around the damping material glass transition temperature, and a damping efficiency that is decreased as the damping temperature range is narrowed.

As a result, the multilayer damping laminates are capable of dissipating vibrational energy over a broader damping temperature range by including alternating damping layers that sequentially exhibit maximal shear strain as the temperature approaches their different glass transition temperatures. In this way, for example, alternating layers of adhesives can absorb vibrational energy in turn as the temperature of the damping laminate approaches the glass transition temperature of each successive adhesive layer. The presence of multiple constraining layers together with a sequential dissipation of vibrational energy over a range of temperatures and frequencies can allow for both higher damping magnitudes as well as damping over a broader temperature and frequency range. Referring to the equation above, these multilayer laminate constructions can provide higher values of the damping temperature range (W), with little or no loss in peak damping (M) for the same material linear density ($\rho_A$), resulting in improved damping efficiency (a).

Damping Layers

In one embodiment, a multilayer damping laminate is disclosed. The laminate comprises a first damping layer having a first glass transition temperature, and a second damping layer having a second glass transition temperature. The damping layers of the laminate have a decreasing glass transition temperature profile beginning at the first damping layer, e.g., the first damping layer glass transition temperature (first glass transition temperature) is greater than the second damping layer glass transition temperature (second glass transition temperature). The difference between the first glass transition temperature and the second glass transition temperature can, for example, range from about 5° C. to about 35° C., e.g., from about 5° C. to about 30° C., from about 5° C. to about 20° C., from about 7.5° C. to about 22.5° C., from about 10° C. to about 25° C., from about 12.5° C. to about 27.5° C., or from about 15° C. to about 30° C. In terms of upper limits, the difference between the first and second glass transition temperatures can be less than about 35° C., e.g., less than about 30.0° C., less than about 27.5° C., less than about 25.0° C., less than about 22.5° C., less than about 20.0° C., less than about 17.5° C., less than about 15.0° C., less than about 12.5° C., less than about 10.0° C., or less than about 7.5° C. In terms of lower limits, the difference between the first and second glass transition temperatures can be greater than about 5° C., e.g., greater than about 7.5° C., greater than about 10.0° C., greater than about 12.5° C., greater than about 15.0° C., greater than about 17.5° C., greater than about 20.0° C., greater than about 22.5° C., greater than about 25° C., or greater than about 27.5° C. Larger temperature differences, e.g., greater than about 35.0° C., and smaller temperature differences, e.g., less than about 5.0° C., are also contemplated.

The composite loss factor of the multilayer damping laminate can be determined as described in ASTM E 756-98, "Standard Test Method for Measuring Vibration-Damping Properties of Materials" (2018). The multilayer damping laminate can have a composite loss factor at 200 Hz that is greater than about 0.05, e.g., greater than about 0.06, greater than about 0.07, greater than about 0.08, greater than about 0.09, greater than about 0.10, greater than about 0.20, greater than about 0.30, greater than about 0.40, or greater than about 0.50. The composite loss factor of the multilayer damping laminate at 200 Hz can be greater than about 0.05 over a temperature range of at least about 20° C., e.g., at least about 22° C., at least about 24° C., at least about 26° C., at least about 28° C., at least about 30° C., at least about 32° C., at least about 34° C., at least about 35° C., at least about 36° C., at least about 38° C., or at least about 40° C. In some embodiments, the provided laminate, which has different first and second damping layer compositions, has suitable composite loss factors over damping temperature ranges that are at least 5° C. higher than the damping temperature range of a similar laminate in which both damping layers have identical compositions, e.g., both layers have the first damping layer composition or both layers have the second damping layer composition.

In certain cases, if the first damping material is selected to be a "high temperature" damping material, with peak damping at 200 Hz occurring at or above 0° C., and the second damping material is selected to be a "low temperature" damping material, with peak damping at 200 Hz occurring at or below 0° C., without any additional design constraints, then the resulting composite loss factor curves can include local minima in which the composite loss factor drops below 0.05. In some embodiments, to avoid such damping disruption the difference between the first glass transition temperature and the second glass transition temperature is selected in part based on the thicknesses of the first damping layer and the second damping layer. The first damping layer can have a first damping layer thickness ($H_1$), and the second damping layer can have a second damping layer thickness ($H_2$). The minimum glass transition temperature difference ($\Delta T_{g,min}$) and the maximum glass transition temperature difference ($\Delta T_{g,max}$) between the first glass transition temperature, $T_g(1)$ and the second glass transition temperature, $T_g(2)$, can, for example, be selected using the equations:

$$\Delta T_{g,max}(°C.) = 15\left(\frac{H_1}{H_2}\right)^2 + 20$$

$$\Delta T_{g,min}(°C.) = -3\left(\frac{H_1}{H_2}\right)^2 + 15$$

The first damping layer thickness and the second damping layer thickness can, for example, each independently range from about 0.1 mil to about 200 mil, e.g., from 0.1 mil to 10 mil, from 0.2 mil to 20 mil, from 0.5 mil to 40 mil, from 1 mil to 90 mil, or from 2 mil to 200 mil. In terms of upper limits, the first and second damping layer thicknesses can each independently be less than 200 mil, e.g., less than 90 mil, less than 40 mil, less than 20 mil, less than 10 mil, less than 5 mil, less than 2 mil, less than 1 mil, less than 0.5 mil, or less than 0.2 mil. In terms of lower limits, the first and second damping layer thicknesses can each independently be greater than 0.1 mil, e.g., greater than 0.2 mil, greater than 0.5 mil, greater than 1 mil, greater than 2 mil, greater than 5 mil, greater than 10 mil, greater than 20 mil, greater than 40 mil, or greater than 90 mil. Larger thicknesses, e.g., greater than 200 mil, and smaller thicknesses, e.g., less than 0.1 mil, are also contemplated.

In some cases, the first glass transition temperature and the second glass transition temperature can, for example, each independently range from about −60° C. to about 100° C., e.g., from −60° C. to 36° C., from −44° C. to 52° C., from −28° C. to 68° C., from −12° C. to 84° C., or from 4° C. to 100° C. In terms of upper limits, the first and second glass transition temperatures can each independently be less than 100° C., e.g., less than 84° C., less than 68° C., less than 52° C., less than 36° C., less than 20° C., less than 4° C., less than −12° C., less than −28° C., or less than −44° C. In terms of lower limits, the first and second glass transition temperatures can each independently be greater than −60° C., e.g., greater than −44° C., greater than −28° C., greater than −12° C., greater than 4° C., greater than 20° C., greater than 36° C., greater than 52° C., greater than 68° C., or greater than 84° C. Larger glass transition temperatures, e.g., greater than 100° C., and smaller glass transition temperatures, e.g., less than −60° C., are also contemplated. The glass transition temperatures described herein can be measured by dynamic mechanical analysis in the linear viscoelastic regime, for example, at 10 radians per second and 0.1% strain.

The relationships between the first and second damping layers of the multilayer damping laminate can also be characterized in terms of their respective plateau moduli. The plateau modulus of a material is a measure of the characteristic elastic storage modulus of the material in the rubbery oscillatory response regime. The compositions of the first and second damping layers can be selected such that the first plateau modulus of the first damping layer and the second plateau modulus of the second damping layer improve the sequential transition of shear strain from the first damping layer to the second damping layer as the temperature approaches their respective glass transition temperatures. In some cases, the damping layers of the laminate can have an increasing plateau modulus profile beginning at the first damping layer, e.g., the second plateau modulus is greater than the first plateau modulus. The ratio of the second plateau modulus to the first plateau modulus can, for example, range from about 1 to about 200, e.g., from 1 to 20, from 2 to 40, from 3 to 70, from 5 to 100, or from 8 to 200. In terms of upper limits, the ratio of the second plateau modulus to the first plateau modulus can be less than 200, e.g., less than 100, less than 70, less than 40, less than 20, less than 10, less than 8, less than 5, less than 3, or less than 2. In terms of lower limits, the ratio of the second plateau modulus to the first plateau modulus can be greater than 1, e.g., greater than 2, greater than 3, greater than 5, greater than 8, greater than 10, greater than 20, greater than 40, greater than 70, or greater than 100. Larger ratios, e.g., greater than 200 are also contemplated.

The materials of the first and second damping layers can also be selected such that the difference between the first plateau modulus and the second plateau modulus is in part based on the thicknesses of the first damping layer and the second damping layer. In some embodiments, the minimum ratio of the second plateau modulus ($G_{0,2}$) to the first plateau modulus ($G_{0,1}$) approaches 1, and the maximum ratio of the second plateau modulus to the first plateau modulus may be selected using the equation:

$$\left(\frac{G_{0,2}}{G_{0,1}}\right)_{max} = 10\left(\frac{H_1}{H_2}\right)^{1.25} + 10$$

The relationships between the first and second damping layers of the multilayer damping laminate can also be characterized in terms of their respective viscoelastic loss factors. In many embodiments, the damping layers of the laminate may each have a viscoelastic loss factor, wherein the difference between the first viscoelastic loss factor and the second viscoelastic loss factor ranges from about 0.2 to about 1.5 if the difference between the first glass transition temperature and the second glass transition temperature is less than about 20° C., and wherein the difference between the first viscoelastic loss factor and the second viscoelastic loss factor ranges from about 0.2 to about 3.0 if the difference between the first glass transition temperature and the second glass transition temperature is greater than about 20° C. In some embodiments, the damping layers of the laminate may each have a viscoelastic loss factor, wherein the difference between the maximum value of the first viscoelastic loss factor and the maximum value of the second viscoelastic loss factor ranges from about 0.2 to about 1.5 if the difference between the first glass transition temperature and the second glass transition temperature is less than about 20° C., and wherein the difference between the maximum value of the first viscoelastic loss factor and the maximum value of the second viscoelastic loss factor ranges from about 0.2 to about 3.0 if the difference between the first glass transition temperature and the second glass transition temperature is greater than about 20° C. The compositions of the first and second damping layers can be selected such that the first viscoelastic loss factor of the first damping layer and the second viscoelastic loss factor of the second damping layer allow each layer to contribute to the generation of an overall composite loss factor greater than about 0.05. In some cases, the first and second damping layers are configured such that the minimum first viscoelastic loss factor ($\tan(\delta)_{1,min}$) and the minimum second viscoelastic loss factor ($\tan(\delta)_{2,min}$) are related to the damping layer thicknesses over the desired operating temperature or frequency range scale according to the equations:

$$\tan(\delta)_{1,min} = 10^{-10} H_1^{-2.5} + 0.25$$

$$\tan(\delta)_{2,min} = 10^{-10} H_2^{-2.5} + 0.25$$

wherein $H_1$ and $H_2$ are each in terms of meters.

The first and second damping layers can also be configured such that the difference between the first and second viscoelastic loss factors is related to the difference between the first and second glass transition temperatures. For example, when the difference (or absolute difference) between the first and second glass transition temperatures is less than about 20° C., the difference (or absolute difference) between the first and second viscoelastic loss factors can range from about 0.2 to about 1.5, e.g., from 0.20 to 0.98, from 0.33 to 1.11, from 0.46 to 1.24, from 0.59 to 1.37, or from 0.72 to 1.50. In terms of upper limits, when the difference between the first and second glass transition temperatures is less than 20° C., the difference between the first and second viscoelastic loss factors can be less than 1.50, e.g., less than 1.37, less than 1.24, less than 1.11, less than 0.98, less than 0.85, less than 0.72, less than 0.59, less than 0.46, or less than 0.33. In terms of lower limits, when the difference between the first and second glass transition temperatures is less than about 20° C., the difference between the first and second viscoelastic loss factors can be greater than about 0.20, e.g., greater than 0.33, greater than 0.46, greater than 0.59, greater than 0.72, greater than 0.85, greater than 0.98, greater than 1.11, greater than 1.24, or greater than 1.37.

As another example, when the difference between the first and second glass transition temperatures is greater than about 20° C., the difference (or absolute difference) between the first and second viscoelastic loss factors can range from about 0.2 to about 3.0, e.g., from 0.20 to 1.88, from 0.48 to 2.16, from 0.76 to 2.44, from 1.04 to 2.72, or from 1.32 to 3.00. In terms of upper limits, when the difference between the first and second glass transition temperatures is greater than about 20° C., the difference between the first and second viscoelastic loss factors can be less than about 3.0, e.g., less than 2.72, less than 2.44, less than 2.16, less than 1.88, less than 1.60, less than 1.32, less than 1.04, less than 0.76, or less than 0.48. In terms of lower limits, when the difference between the first and second glass transition temperatures is greater than about 20° C., the difference between the first and second viscoelastic loss factors can be greater than about 0.2, e.g., greater than 0.48, greater than 0.76, greater than 1.04, greater than 1.32, greater than 1.6, greater than 1.88, greater than 2.16, greater than 2.44, or greater than 2.72.

The compositions of each of the damping layers can include elastic, anelastic, viscous, and/or viscoelastic materials. For instance, the damping material can be compressible and can comprise a restorative force. In an aspect, the damping materials can include rubber, plastic, e.g., nylon, leather, fabric, foam, sponge, gel, or the like. The damping layers may be a composite design. In some embodiments, each damping layer includes one or more viscoelastic damping materials. In some embodiments, the first damping layer comprises a first viscoelastic damping material, and the second damping layer comprises a second viscoelastic damping material. In many embodiments, the first damping layer with the first viscoelastic damping material comprises an adhesive. In many embodiments, the second damping layer with the second viscoelastic damping material also comprises an adhesive. In many embodiments, the adhesive in at least one of the first damping layer and the second damping layer comprises a pressure sensitive adhesive.

The damping materials can include one or more silicone adhesives. The silicone adhesives can include polyorganosiloxane dispersions or gums, such as polydimethylsiloxanes, polydimethyl/methylvinyl siloxanes, polydimethyl/methylphenyl siloxanes, polydimethyl/diphenyl siloxanes, and blends thereof. The silicone adhesives can include silicone resins, such as MQ resins or blends of resins. Non-limiting examples of such silicone adhesive compositions which are commercially available include adhesives 7651, 7652, 7657, Q2-7406, Q2-7566, Q2-7735 and 7956, all available from Dow Corning (Midland, Mich.); SILGRIP™ PSA518, 590, 595, 610, 915, 950 and 6574 available from Momentive Performance Materials (Waterford, N.Y.); and KRT-009 and KRT-026 available from Shin-Etsu Silicone (Akron, Ohio).

The damping materials can comprise an acrylic-based or silicone-based monomer. In some embodiments, the damping materials comprise one or more acrylic-based monomers selected from the group consisting of methyl acrylate, ethyl acrylate, butyl acrylate, 2-ethylhexyl acrylate, isooctyl acrylate, isobornyl acrylate, isononyl acrylate, isodecyl acrylate, methylacrylate, methyl methacrylate, methylbutyl acrylate, 4-methyl-2-pentyl acrylate, butyl methacrylate, 2-ethylhexyl methacrylate, and isooctyl methacrylate. Useful alkyl acrylate esters include n-butyl acrylate, 2-ethyl hexyl acrylate, isooctyl acrylate. In one embodiment, the acrylic ester monomer is polymerized in the presence of a vinyl ester such as vinyl acetate, vinyl butyrate, vinyl propionate, vinyl isobutyrate, vinyl valerate, vinyl versitate, and the like. The vinyl ester can be present in a total amount of up to about 35 wt %, based on total weight of the monomers forming the acrylate main chain. In one embodiment, an acrylic ester monomer is copolymerized with an unsaturated carboxylic acid. The unsaturated carboxylic acid can include, among others, acrylic acid, methacrylic acid, itaconic acid, beta carboxy ethyl acrylate and the like.

In some embodiments, the damping materials comprise one or more silicone-based monomers selected from the group consisting of siloxanes, silane, and silatrane glycol. In some embodiments, the damping materials comprise one or more silicone-based monomers selected from the group consisting of 1,4-bis[dimethyl[2-(5-norbornen-2-yl)ethyl]silyl]benzene; 1,3-dicyclohexyl-1,1,3,3-tetrakis(dimethylsilyloxy)disiloxane; 1,3-dicyclohexyl-1,1,3,3-tetrakis(dimethylvinylsilyloxy)disiloxane; 1,3-dicyclohexyl-1,1,3,3-tetrakis[(norbornen-2-yl)ethyldimethylsilyloxy]disiloxane; 1,3-divinyltetramethyldisiloxane; 1,1,3,3,5,5-hexamethyl-1, 5-bis[2-(5-norbornen-2-yl)ethyl]trisiloxane; 1,1,3,3-tetramethyl-1,3-bis[2-(5-norbornen-2-yl)ethyl]disiloxane; 2,4,6,8-tetramethyl-2,4,6,8-tetravinylcyclotetrasiloxane; N-[3-(trimethoxysilyl)propyl]-N'-(4-vinylbenzyl) ethylenediamine; and 3-[tris(trimethylsiloxy)silyl]propyl vinyl carbamate.

The damping materials can comprise a silicone polymer, an acrylic polymer, or a methacrylic polymer. Suitable acrylic polymers include, but are not limited to, 52000N, S692N, AT20N, XPE 1043, and XPE 1045, all available from Avery Dennison (Glendale, Calif.); and H9232 available from BASF (Florham Park, N.J.). In one embodiment, the acrylic polymer composition is blended with rubber polymers, including but not limited to multiblock copolymers such as styreneisoprene-styrene (SIS), styrene-ethylenebutylene-styrene (SEBS) and the like in an amount of up to 30% by dry weight of the polymer. Examples of useful triblocks are available from Kraton Polymer Inc. (Houston, Tex.). Multiblock polymers can be useful in modifying the damping peak and other physical properties of the acrylic composition. Other damping materials may comprise a rubber polymer. Suitable rubber polymers include, but are not limited to, elastomers, butyl rubber, styrenic block copolymer (known as SBCs, from example, Kraton), silicone rubber, nitrile rubber, isoprene, butadiene. In some embodiments, the rubber polymer composition may be blended with an acrylic polymer and/or acrylic polymer.

A wide array of functional groups can be incorporated in a polymer of the damping materials. The functional groups can be incorporated into the polymer formed from the acrylic-based monomer or the silicon-based monomer, for example as end segments. Representative functional groups include, without limitation, hydroxy, epoxy, cyano, isocyanate, amino, aryloxy, aryalkoxy, oxime, aceto, epoxyether and vinyl ether, alkoxymethylol, cyclic ethers, thiols, benzophenone, acetophenone, acyl phosphine, thioxanthone, and derivatives of benzophenone, acetophenone, acyl phosphine, and thioxanthone.

Functional groups that have hydrogen-bonding capability are well known and include carboxyl, amide, hydroxyl, amino, pyridyl, oxy, carbamoyl and mixtures thereof. In some embodiments, an acrylic polymer backbone of the damping materials includes the polar comonomers vinyl pyrrolidone and acrylic acid. Examples of other monomers with hydrogen-bonding functionality include methacrylic acid, vinyl alcohol, caprolactone, ethylene oxide, ethylene glycol, propylene glycol, 2-hydroxyethyl acrylate, N-vinyl caprolactam, acetoacetoxyethyl methacrylate and others.

In some embodiments, the damping materials comprise one or more co-monomers bearing a functionality that can be further crosslinked. Examples of crosslinkable co-monomers include (meth) acrylic acid, 2-hydroxyethyl acrylate, glycidyl methacrylate, itaconic acid, allyl glycidyl ether and the like, and mixtures thereof. Functional moieties, such as those described above, can be used to crosslink polymer chains, to attach the high side chains to the backbone, or both.

The damping materials can further comprise a crosslinker, which can vary widely. Examples of suitable crosslinkers include multifunctional acrylates and methacrylates, such as diacrylates (ethylene glycol diacrylate, propylene glycol diacrylate, polyethylene glycol diacrylate, and hexanediol diacrylate), dimethacrylates (ethylene glycol diacrylate, diethylene glycol dimethacrylate, and 1,3 butane glycol dimethacrylate), triacrylates (trimethylolpropane trimethacrylate, ethoxylated trimethylolpropane triacrylate, and pentaerythritol triacrylate), and trimethacrylates (pentaerythritol trimethacrylate and trimethylolpropane trimethacrylate), as well as divinyl esters, such as divinylbenzene, divinyl succinate, divinyl adipate, divinyl maleate, divinyl oxalate, and divinyl malonate.

Additional crosslinkers present in the damping materials can serve to form crosslinks in a silicone-based matrix. In some embodiments, a peroxide crosslinker, such as dibenzoylperoxide, is suitable. In some embodiments, the crosslinker is a compound that contains silicon-hydride functionality. Non-limiting examples of such crosslinkers include PEROXAN BP 50W, PEROXAN BIC, and PEROXAN Bu, all available from Pergan (Bocholt, Germany); LUPEROX® A75 and A98 commercially available from Arkema (King of Prussia, Pa.); and PERKADOX® CH-50 and PD 50SPS from Akzo Nobel (Chicago, Ill.). Crosslinking can be facilitated and/or promoted by heating or other techniques generally depending upon the chemical system employed.

Other exemplary chemical crosslinkers that can be used in the damping materials include, but are not limited to, di-, tri- or poly-isocyanates with or without a catalyst (such as dibutyltin dilaureate); ionic crosslinkers; and di-, tri- or poly-functional aziridines. Illustrative, non-limiting examples of commercially available chemical crosslinkers include aluminum acetyl acetonate (AAA) available from NOAH Technologies (San Antonio, Tex.); TYZOR® available from DuPont (Wilmington, Del.); XAMA® available from Bayer (Pittsburgh, Pa.); and PAPI™ and VORONATE™, available from Dow Chemical.

The damping materials can optionally comprise one or more tackifiers or resins, and these tackifiers (when employed) can vary widely. In some cases, the tackifier of the damping materials includes a single tackifier. In other cases, the tackifier comprises a mixture of multiple tackifier products. Suitable commercial tackifiers include (but are not limited to), for example, hydrogenated DCPD resins such as HD1100, HD1120 from Luhua (China), and E5400 from Exxon Mobil (Houston, Tex.). Other suitable hydrogenated resins include fully hydrogenated resins such as REGALITE™ 51100, R1090, R1100, C100R, and C100W from Eastman (Kingsport, Tenn.); and fully hydrogenated C9 resins QM-100A and QM-115A from Hebei Qiming (China).

The damping materials can also optionally comprise one or more plasticizers, and these plasticizers (when employed) can vary widely. In some embodiments, the plasticizer has a high molecular weight and/or a high viscosity. In some cases, the plasticizer includes a single plasticizer. In other cases, the plasticizer comprises a mixture of multiple plasticizer products. Suitable commercial plasticizers include (but are not limited to), for example, KN 4010 and KP 6030 from Sinopec (Beijing, China); Claire F55 from Tianjin (China); F550 from *Formosa* Petrochemical (China), and various polyisobutene products.

The damping materials can optionally comprise one or more waxes, and these waxes (when employed) can vary widely. In some cases, the wax includes a single wax. In other cases, the wax comprises a mixture of multiple wax products. The wax can have a higher molecular weight so as to advantageously improve oil migration. Exemplary waxes include microcrystalline waxes, paraffin waxes, hydrocarbon waxes, and combinations thereof. Suitable commercial waxes include (but are not limited to), for example, Sasol wax 3971, 7835, 6403, 6805, and 1800 from Sasol (Houston, Tex.); A-C1702, A-C6702, A-05180 from Honeywell (Morristown, N.J.); and MICROWAX™ FG 7730 and MICROWAX™ FG 8113 from Paramelt (Muskegon, Mich.).

The damping materials can comprise one or more powder additives selected to improve damping performance across a broader range of operating temperatures. In some embodiments, the damping materials comprise one or more acrylic-based powder additives. Suitable commercially available acrylic-base powder additives include SPHEROMERS® CA 6, SPHEROMERS® CA 10, SPHEROMERS® CA 15, KRATON® SBS 1101 AS, KRATON® SB 1011 AC, KRATON® TM 1116 Polymer, KRATON® D1101 A Polymer, KRATON® D1114 P Polymer KRATON® D1114 P Polymer, Zeon NIPOL® 1052, Zeon NIPOL®1041, and Zeon NIPOL®NS 612. In some embodiments, the damping materials comprise one or more silicone-based powder additives. Suitable commercially available silicone-base powder additives include Shin-Etsu KMP 597, Shin-Etsu KMP 600, and Shin-Etsu KMP 701.

In some embodiments, the damping materials include one or more high surface area inorganic fillers or combinations of fillers and pigments. A high surface may include a surface area ranging from about 0.01 $m^2/g$ to about 300 $m^2/g$. High surface area inorganic fillers may include fillers such as, but not limited to, carbon black, calcium carbonate, titanium dioxide, silica (hydrophilic and hydrophobic modified), mica, talc, kaolin, clay, diatomaceous earth, barium sulfate, aluminum sulfate, or mixtures of two or more thereof. Examples of commercially available high surface area inorganic fillers include those available from Evonik Degussa GmbH (Essen, Germany) Inorganic fillers including the foregoing examples can be used to modulate the damping and other physical properties of the damping patch. A wide variety of organic fillers could also or alternatively be used.

In another embodiment, an example filler combination may include an anti-blocking agent which is chosen depending on the processing and/or use conditions. Examples of such agents include, for example, silica, talc, diatomaceous earth, and any mixtures thereof. The filler particles can be finely divided substantially water-insoluble inorganic filler particles.

The finely divided substantially water-insoluble inorganic filler particles can include particles of metal oxides. The metal oxide constituting the particles can be a simple metal oxide, i.e., the oxide of a single metal, or it can be a complex metal oxide, i.e., the oxide of two or more metals. The particles of metal oxide can be particles of a single metal oxide or they can be a mixture of different particles of different metal oxides. Examples of suitable metal oxides include alumina, silica, and titania. Other oxides can optionally be present in minor amount. Examples of such optional oxides include, but are not limited to, zirconia, hafnia, and yttria. Other metal oxides that can optionally be present are those that are ordinarily present as impurities such as for example, iron oxide. For purposes of the present specification and claims, silicon is considered to be a metal. When the particles are particles of alumina, most often the alumina is alumina monohydroxide. Particles of alumina monohydroxide, AlO(OH), and their preparation are known.

Metallic particulates can be used in the damping materials, for example, metal powders such as aluminum, copper or special steel, molybdenum disulfide, iron oxide, e.g., black iron oxide, antimony-doped titanium dioxide and nickel doped titanium dioxide. Metal alloy particulates can also be used.

Additives, such as carbon black and other pigments, ultraviolet light absorbers, ultraviolet stabilizers, antioxidants, fire retardant agents, thermally or electrically conductive agents, post curing agents, and the like can be blended into the damping materials to modify the properties of the damping patch. These additives can also include, for example, one or more inhibitors, defoamers, colorants, luminescents, buffer agents, anti-blocking agents, wetting agents, matting agents, antistatic agents, acid scavengers, processing aids, extrusion aids, and others. Ultraviolet light absorbers include hydroxyphenyl benzotriazoles and hydrobenzophenones. Antioxidants include, for example, hindered phenols, amines, and sulfur and phosphorus hydroxide decomposers, such as Irganox 1520L. The fillers, pigments, plasticizers, flame retardants, UV stabilizers, and the like are optional in many embodiments and can be used at concentrations of from 0 to 30% or more, such as up to 40% in particular embodiments. In certain embodiments, the total amount of fillers (inorganic and/or organic), pigments, plasticizers, flame retardants, UV stabilizers, and combinations thereof is from 0.1% to 30%, and more particularly from 1% to 20%.

The damping materials can also comprise one or more solvents. Nonlimiting examples of suitable solvents include toluene, xylene, tetrahydrofuran, hexane, heptane, cyclohexane, cyclohexanone, methylene chloride, isopropanol, ethanol, ethyl acetate, butyl acetate, isopropyl acetate, and combinations thereof. It will be appreciated that the present subject matter damping materials are not limited to such solvents and can utilize a wide array of other solvents, additives, and/or viscosity adjusting agents, such as reactive diluents.

Constraining Layers

In some cases, the first and second damping layers may be separated from one another by an internal constraining layer, at least a portion of which is disposed between the first damping layer the second damping layer. One face of the internal constraining layer can be directly adjacent to the first damping layer, or there can be one or more intervening layers disposed between the internal constraining layer and the first damping layer. An opposite face of the internal constraining layer can be directly adjacent to the second damping layer, or there can be one or more intervening layers disposed between the internal constraining layer and the second damping layer.

In some cases, the multilayer damping laminate comprises an external constraining layer. At least a portion of the second damping layer of the laminate can be disposed between the first damping layer and the external constraining layer. At least a portion of the second damping layer can be disposed between the internal constraining layer and the external constraining layer. One face of the external constraining layer can be directly adjacent to the second damping layer, or there can be one or more intervening layers between the second damping layer and the external constraining layer. In some cases, one face of the second damping layer is directly adjacent to the internal constraining layer, and an opposite face of the second damping layer is directly adjacent to the external constraining layer.

The thicknesses of the internal constraining layer and the external constraining layer can, for example, each independently range from about 0.2 mil to about 120 mil, e.g., from 0.2 mil to 9 mil, from 0.4 mil to 20 mil, from 0.7 mil to 35 mil, from 1.5 mil to 65 mil, or from 2.5 mil to 120 mil. The internal and external constraining layer thicknesses can each independently range from about 2 mil to about 50 mil, e.g., from 2 mil to 15 mil, from 3 mil to 20 mil, from 4 mil to 25 mil, from 5.5 mil to 35 mil, or from 7 mil to 50 mil. In terms of upper limits, the internal and external constraining layer thicknesses can each independently be less than about 120 mil, e.g., less than 65 mil, less than 50 mil, less than 35 mil, less than 25 mil, less than 20 mil, less than 15 mil, less than 10 mil, less than 9 mil, less than 7 mil, less than 5.5 mil, less than 5 mil, less than 4 mil, less than 3 mil, less than 2.5 mil, less than 1.5 mil, less than 0.7 mil, or less than 0.4 mil. In terms of lower limits, the internal and external constraining layer thicknesses can each independently be greater than about 0.2 mil, e.g., greater than 0.4 mil, greater than 0.7 mil, greater than 1.5 mil, greater than 2.5 mil, greater than 3 mil, greater than 4 mil, greater than 5 mil, greater than 5.5. mil, greater than 7 mil, greater than 9 mil, greater than 10 mil, greater than 15 mil, greater than 20 mil, greater than 25 mil, greater than 35 mil, greater than 50 mil, or greater than 65 mil. Larger thicknesses, e.g., greater than 120 mil, and smaller thicknesses, e.g., less than 0.2 mil, are also contemplated.

The internal and external constraining layers can each independently comprise one or more stiffening materials, wherein each of the constraining layers can have a similar or different composition. The stiffening materials can include one or more polymeric materials. Nonlimiting examples of polymeric materials include polyvinyl chloride (PVC), polyolefins such as polyethylene (PE) and/or polypropylene (PP), polyethylene terephthalate (PET), polycarbonate (PC), polystyrene (PS), and combinations of these and other materials.

The stiffening materials can include one or more metals or metal alloys. Nonlimiting examples of metals include aluminum, steel, magnesium, bronze, copper, brass, titanium, iron, beryllium, molybdenum, tungsten, or osmium. In some embodiments, the internal and external constraining layers are each independently a metal foil.

The stiffening materials can include one or more natural or manufactured woods. The stiffening materials can include one or more fibers. Nonlimiting examples of fibers include hemp fibers, flax fibers, glass fibers, and carbon fibers. The stiffening materials can include one or more carbon based materials, including carbon nanotubes, graphene, diamond, carbine, or combinations thereof. The stiffening materials may also include ceramics. Composite materials and combinations of these materials could also be used.

Liner Layer

In some cases, the multilayer laminate film comprises a liner layer connected to the first damping layer. One face of the liner layer can be directly adjacent to the first damping layer, or there can be one or more intervening layers between the first damping layer and the liner layer. In some cases, one face of the first damping layer is directly adjacent to the internal constraining layer, and an opposite face of the first damping layer is directly adjacent to the liner layer.

The releasable liner can function as a protective cover such that the release liner remains in place until the multilayer damping laminate is ready for attachment to an object or surface. If a liner or release liner is included in the laminate, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release coated face of the liner is placed in contact with the otherwise exposed face of the outer first damping layer. Prior to application of the label to a surface of interest, the liner is removed to thereby expose the first damping layer of the laminate. The liner can be in the form of a single sheet. Alternatively, the liner can be in the form of multiple sections or panels.

Generalized Multilayer Damping Laminate

In one embodiment, another multilayer damping laminate is disclosed. The multilayer damping laminate may have the first damping layer and the second damping layer, as described herein. Additionally, the multilayer damping laminate may comprise more damping layers in addition to the first damping layer and the second damping layer. In general, the multilayer damping laminate comprises N damping layers, each independently having a glass transition temperature $T_g$, wherein N is an integer greater than or equal to 2. The N damping layers are arranged such that the first damping layer is the damping layer to be placed directly in contact with a vibrating substrate to dissipate the vibrations. The damping layers above the first damping layer are then numbered in increasing sequential order, wherein each damping layer has a glass transition temperature less than that of the damping layer beneath it. The relationship between each of the damping layer glass transition temperatures of the multilayer damping laminate is then described by the inequality:

$$T_g(N) < T_g(N-1) < T_g(N-2) < \ldots < T_g(1)$$

In some embodiments, each damping layer also has a plateau modulus $G_o$ that is greater than that of the damping layer beneath it. The relationship between each of the damping layer plateau moduli of the multilayer damping laminate is then described by the inequality:

$$G_o(N) > G_o(N-1) > G_o(N-2) > \ldots > G_o(1)$$

As an illustrative example, in some embodiments N=2. In such a construction, when the operating temperature is near the first glass transition temperature $T_g(1)$, the bottom adhesive (layer 1) is going through its glass transition. Since this damping layer is in direct contact with the vibrating substrate, the layer may undergo shear deformation allowing for vibrational energy dissipation. Also, because this damping layer has the lowest plateau modulus $G_o$, it will undergo maximal shear deformation. As the operating temperature of the laminate approaches the second glass transition temperature $T_g(2)$ ($<T_g(1)$), the bottom damping layer enters its glassy regime and thus act like a glassy solid. Therefore, at a temperature near $T_g(2)$, the bottom damping layer would act as an infinitesimal increment to the thickness of the vibrating substrate as the top damping layer is going through its glass transition. Since the bottom damping layer 1 is glassy at this temperature, all the shear strain will be concentrated on the top damping layer. In this way, as the temperature of the multilayer damping laminate changes from $T_g(1)$ to $T_g(2)$, the damping is sequentially transferred from the bottom damping layer to the top damping layer thereby allowing for damping over a broader temperature range. In summary, both of the layers act as damping layers around their respective glass transition temperatures.

The present disclosure also relates to systems that comprise a base substrate and a multilayer damping laminate as described above. The base substrate can, for example, be a surface of a vehicle, appliance, or electronic device. In some embodiments, a vehicle comprises the vibration reduction sheet. In some embodiments, the vehicle is an automobile.

The following embodiments are contemplated. All combinations of features and embodiment are contemplated.

Embodiment 1

A multilayer damping laminate comprising: a first damping layer having a first glass transition temperature and a first damping layer thickness ($H_1$); a second damping layer having a second glass transition temperature and a second damping layer thickness ($H_2$); an internal constraining layer, at least a portion of which is disposed between the first damping layer and the second damping layer; and an external constraining layer, wherein at least a portion of the second damping layer is disposed between the internal constraining layer and the external constraining layer, wherein the damping layers of the laminate have a decreasing glass transition temperature profile beginning at the first damping layer, and wherein the multilayer damping laminate has a composite loss factor at 200 Hz that is greater than 0.05.

Embodiment 2

An embodiment of embodiment 1, wherein the composite loss factor is greater than 0.1.

Embodiment 3

An embodiment of embodiment 3, wherein the composite loss factor is greater than 0.05 over a temperature range of at least 30° C.

Embodiment 4

An embodiment of any embodiment of embodiments 1-3, wherein the difference between the first glass transition temperature and the second glass transition temperature ranges from $(-3(H_1/H_2)^2+15)$ ° C. to $(15(H_1/H_2)^2+20)$ ° C.

Embodiment 5

An embodiment of any embodiment of embodiments 1-4, wherein the first glass transition temperature is at least 5° C. greater than the second glass transition temperature.

Embodiment 6

An embodiment of any embodiment of embodiments 1-5, wherein the difference between the first glass transition temperature and the second glass transition temperature ranges from 5° C. to 35° C.

Embodiment 7

An embodiment of any embodiment of embodiments 1-6, wherein the first glass transition temperature ranges from −60° C. to 100° C.

Embodiment 8

An embodiment of any embodiment of embodiments 1-7, wherein the second glass transition temperature ranges from −60° C. to 100° C.

Embodiment 9

An embodiment of any embodiment of embodiments 1-8, wherein the first damping layer has a first plateau modulus, wherein the second damping layer has a second plateau modulus, and wherein the damping layers of the laminate have an increasing plateau modulus profile beginning at the first damping layer.

Embodiment 10

An embodiment of embodiment 9, wherein the ratio of the second plateau modulus to the first plateau modulus ranges from 1 to $(10(H_1/H_2)^{1.25}+10)$.

Embodiment 11

An embodiment of any embodiment of embodiments 1-10, wherein the first damping layer has a first viscoelastic loss factor greater than $((10^{-10}/H_1^{2.5})+0.25)$, and wherein the second damping layer has a second viscoelastic loss factor greater than $((10^{-10}/H_2^{2.5})+0.25)$, wherein $H_1$ and $H_2$ each have units of meters.

Embodiment 12

An embodiment of embodiment 11, wherein the difference between the first viscoelastic loss factor and the second viscoelastic loss factor ranges from 0.2 to 1.5 if the difference between the first glass transition temperature and the second glass transition temperature is less than 20° C., and wherein the difference between the first viscoelastic loss factor and the second viscoelastic loss factor ranges from 0.2 to 3 if the difference between the first glass transition temperature and the second glass transition temperature is greater than 20° C.

Embodiment 13

An embodiment of any embodiment of embodiments 1-12, wherein the first damping layer comprises a first viscoelastic damping material and the second damping layer comprises a second viscoelastic damping material.

Embodiment 14

An embodiment of any embodiment of embodiments 1-13, wherein the internal constraining layer and the external constraining layer each independently comprise a metal.

Embodiment 15

An embodiment of any embodiment of embodiments 1-14, wherein the internal constraining layer and the external constraining layer are each independently a metal foil.

Embodiment 16

An embodiment of any embodiment of embodiments 1-15, wherein the first damping layer thickness ranges from 0.1 mil to 200 mil.

Embodiment 17

An embodiment of any embodiment of embodiments 1-16, wherein the second damping thickness ranges from 0.1 mil to 200 mil.

Embodiment 18

An embodiment of any embodiment of embodiments 1-17, wherein the internal constraining layer and the external constraining layer each independently have a thickness ranging from 0.2 mil to 120 mil.

Embodiment 19

An embodiment of any embodiment of embodiments 1-17, wherein the internal constraining layer and the external constraining layer each independently have a thickness ranging from 2 mil to 50 mil.

Embodiment 20

An embodiment of any embodiment of embodiments 1-19, further comprising: a liner layer connected to the first damping layer opposite the second damping layer.

Embodiment 21

A multilayer damping laminate comprising: N damping layers, wherein N is an integer greater than or equal to 2, wherein at least a portion of each damping layer is coextensive with the other damping layers, and wherein each damping layer independently has a glass transition temperature ($T_g$) wherein $T_g(N) < T_g(N-1) < T_g(N-2) << T_g(1)$; N−1 internal constraining layers, wherein at least a portion of each $M^{th}$ internal constraining layer is disposed between the $M^{th}$ damping layer and the $(M+1)^{th}$ damping layer, wherein M is an integer ranging from 1 to N−1; and an external constraining layer, wherein at least a portion of the $N^{th}$ damping layer is disposed between the $(N-1)^{th}$ constraining layer and the external constraining layer.

Embodiment 22

An embodiment of embodiment 21, wherein each damping layer independently has a plateau modulus ($G_o$), and wherein $G_o(N) > G_o(N-1) > G_o(N-2) >> G_o(1)$.

Embodiment 23

A system comprising: a base substrate; and the multilayer damping laminate of an embodiment of any embodiment of embodiments 1-22, wherein the first damping layer is connected to the base substrate.

Embodiment 24

A method of reducing a vibration of a base substrate, the method comprising: providing a base substrate that is subject to a vibration; and connecting the first damping layer of the multilayer damping laminate of an embodiment of any embodiment of embodiments 1-22 to the base substrate, thereby reducing the vibration of the base structure.

Embodiment 25

An embodiment of embodiment 24, further comprising: shifting a location of maximum shear strain from the first damping layer to the second damping layer as the temperature of the multilayer damping laminate changes from the first glass transition temperature to the second glass transition temperature when measured at a frequency of interest.

Embodiment 26

An embodiment of embodiment 24 or 25, wherein the vibration of the base structure is dissipated over a sequential range of temperatures and frequencies.

The present disclosure will be better understood in view of the following non-limiting examples.

EXAMPLES

Five different viscoelastic damping materials having rheological properties shown in Table 1 below were used in the construction of different exemplary multilayer damping laminates. The materials in Table 1 include acrylic copolymer material A, rubber block copolymer material B, tackified acrylic copolymer material C, acrylic copolymer material D, and a tackified version of material D as material E. The properties of each material were measured by oscillatory shear rheology at an applied strain of 0.1% and a frequency of 10 radians per second using a DHR-2 rheometer manufactured by TA Instruments (New Castle, Del.). Whenever required, the material property was suitably shifted to the frequency range of application using time-temperature superposition to correlate with the design rules. The maximum value of tan(δ) was the value of tan(δ) at the glass transition temperature. The plateau modulus was taken as the value of storage modulus at that temperature beyond glass-transition temperature where tan(δ) first reached a local minimum.

TABLE 1

Viscoelastic Damping Materials

| | $T_g$ (° C.) | $\tan(\delta)_{max}$ | $G_0$ (Pa) |
|---|---|---|---|
| Material A | 6.0 | 1.8 | 61,000 |
| Material B | −9.5 | 1.6 | 250,000 |
| Material C | 3.9 | 1.8 | 33,000 |
| Material D | −29.6 | 1.4 | 32,000 |
| Material E | −13.8 | 2.3 | 13,000 |

Eight different multilayer damping laminates were each configured using two of the five damping materials of Table 1. Four exemplary laminates included damping material layers in specific configurations as discussed herein, while four comparative laminates included the same damping material layers configured in the inverse order. Performance properties of the eight laminates are presented in Table 2 shown below. The composite loss factor (CLF) for each laminate was measured following SAE J1637 (2018) or the ASTM E-756 (2018) on a 0.75-mm thick stainless steel beam at a reference frequency of 200 Hz. In Table 2, "DL" refers to damping layer, and "CL" refers to constraining layer. Those cells of Table 2 that include two values list the value for the bottom layer first and the value for the top layer second, wherein the "bottom" damping material refers to the first damping layer, i.e., the material that is in direct contact with the vibrating substrate, and the "top" damping material refers to the second damping layer, i.e., the material that is disposed between the internal and external constraining layers. The width of the CLF, i.e., the damping temperature range, is measured for CLF>0.05.

Example 2 of Table 2 was a multilayer damping laminate using 5 mil each of material B and material C from Table 1. When these damping materials were configured as described in this disclosure, that is, with the higher $T_g$ material having lower plateau modulus layered as the bottom damping material, and the lower $T_g$ material with higher plateau modulus layered as the top damping material, a 50% increase in the CLF width and negligible decrease in peak CLF (as compared to Comparative Example B) were observed. Comparative Example B was instead constructed with material B as the bottom damping layer and material C as the top damping layer, thereby not having a configuration as described herein. Using the plateau modulus values of Table 1, it can be seen that the plateau modulus ratio G0,2/G0,1 for Example 2 with material C as the bottom damping layer and material B as the top damping layer was approximately 8, whereas for Example 1 with material A as the bottom damping layer and material B as the top damping layer, the plateau modulus ratio is approximately 4. Therefore, while materials A and C have similar rheological material properties, a higher value of the plateau modulus ratio for Example 2 allows for a significantly higher CLF width.

Example 3 of Table 2 was a multilayer damping laminate using 5 mil each of material C and material D from Table 1. When these damping materials were configured as described in this disclosure, that is, with the higher $T_g$ material having lower plateau modulus layered at the bottom damping material, and the lower $T_g$ material with higher plateau modulus layered as the top damping material, a 20% increase in the CLF width and negligible decrease in peak CLF (as compared to Comparative Example C) were observed. Comparative Example C was instead constructed with material D as the bottom damping layer and material C as the top damping layer, thereby not having a configuration

TABLE 2

Multilayer Damping Laminates

| | Ex. 1 | Comp. A | Ex. 2 | Comp. B | Ex. 3 | Comp. C | Ex. 4 | Comp. D |
|---|---|---|---|---|---|---|---|---|
| DL Material | A/B | B/A | C/B | B/C | C/D | D/C | A/E | E/A |
| DL Thickness (mil) | 5/5 | 5/5 | 5/5 | 5/5 | 5/5 | 5/5 | 5/5 | 5/5 |
| CL Material | Al/Al | Al/Al | Al/Al | Al/Al | Al/Al | Al/Al | Al/Al | Al/Al |
| CL Thickness (mil) | 5/5 | 5/5 | 5/5 | 5/5 | 5/5 | 5/5 | 5/10 | 10/5 |
| Linear Density ($\times 10^{-4}$ kg/m) | 4.7 | 4.7 | 4.7 | 4.7 | 4.7 | 4.7 | 8.3 | 8.3 |
| Peak CLF | 0.17 | 0.13 | 0.12 | 0.13 | 0.25 | 0.26 | 0.26 | 0.32 |
| CLF Width (° C.) | 43.8 | 35.0 | 53.0 | 35.0 | 83.0 | 69.0 | 50.3 | 49.6 |
| Damping Efficiency ($\times 10^{4}$ ° C. m/kg) | 1.5 | 1.0 | 1.3 | 1.0 | 4.4 | 3.8 | 1.6 | 1.9 |

Example 1 of Table 2 was a multilayer damping laminate using 5 mil each of material A and material B from Table 1. When these damping materials were configured as described in this disclosure, that is, with the higher $T_g$ material having lower plateau modulus layered as the bottom damping material, and the lower $T_g$ material with higher plateau modulus layered as the top damping material, a 25% increase in the CLF width and a 30% increase in peak CLF (as compared to Comparative Example A) were surprisingly observed. Comparative Example A was instead constructed with material B as the bottom damping layer and material A as the top damping material, thereby not having a configuration as described herein. Furthermore, while both orderings lead to a damping laminate having the same linear density, the laminate with material A at bottom and material B at top demonstrated a 50% increase in damping efficiency.

as described herein. The ordering of the damping layers following differentiated rheology led to an increased damping efficiency. It is also noted that despite the relatively large difference (33□) between the glass transition temperatures of material C and material D, by ensuring that the difference in peak tan(δ) and the plateau modulus ratio are within the bounds described in many of the embodiments above, a multilayer damping laminate with a very broad damping temperature range was obtained without adding additional weight to the treatment. In many embodiments, the multilayer damping laminate may be designed to provide a lightweight structure for its intended application.

Conventional approaches involving different viscoelastic damping materials to broaden the width of damping curves describe the use of "high temperature" materials, with peak damping at 200 Hz occurring at or above 0° C., in a bottom layer and a "low temperature" damping material, with peak damping at 200 Hz occurring at or below 0° C., in a top layer, with no further description of what constitutes a preferred or acceptable "high temperature" or "low temperature" material. If one considers a "high-temperature" damping material to be one with a high glass transition temperature, and a "low-temperature" damping material to be one with a lower glass transition temperature, then layering material A at the bottom and material E at the top (Example 4) would be expected to result in a significantly broader CLF curve as compared to the configuration in which material E is layered at the bottom and material A is layered at the top (Comparative Example D). The results in Table 2 instead show, however, that the laminate construction with material A at the bottom and material E at the top provides only a negligible increase in damping width when compared to Comparative Example D. Furthermore, the Example 4 construction also leads to a reduced peak CLF as compared to Comparative Example D. This observation can be caused by the Example 4 $G_{o,2}/G_{o,1}$ plateau modulus ratio of only 0.2, which is smaller than the plateau modulus ratios of Examples 1-3. These results demonstrate the further improvements that can be realized in broadening damping temperature regions by configuring damping layers according to plateau modulus ratios as described above.

While what is disclosed has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. A multilayer damping laminate comprising:
   a first damping layer having a first glass transition temperature and a first damping layer thickness ($H_1$);
   a second damping layer having a second glass transition temperature and a second damping layer thickness ($H_2$);
   an internal constraining layer, at least a portion of which is disposed between the first damping layer and the second damping layer; and
   an external constraining layer, wherein at least a portion of the second damping layer is disposed between the internal constraining layer and the external constraining layer, wherein the damping layers of the laminate have a decreasing glass transition temperature profile beginning at the first damping layer, and wherein the multilayer damping laminate has a composite loss factor at 200 Hz that is greater than about 0.05;
   wherein the difference between the first glass transition temperature and the second glass transition temperature ranges from $(-3(H_1/H_2)^2+15)$ ° C. to $(15(H_1/H_2)^2+20)$ ° C.

2. The multilayer damping laminate of claim 1, wherein the composite loss factor is greater than about 0.1.

3. The multilayer damping laminate of claim 1, wherein the composite loss factor is greater than about 0.05 over a temperature range of at least 30° C.

4. The multilayer damping laminate of claim 1, wherein the first glass transition temperature is at least 5° C. greater than the second glass transition temperature.

5. The multilayer damping laminate of claim 1, wherein the difference between the first glass transition temperature and the second glass transition temperature ranges from about 5° C. to about 35° C.

6. The multilayer damping laminate of claim 1, wherein the first glass transition temperature ranges from about −60° C. to about 100° C.

7. The multilayer damping laminate of claim 1, wherein the second glass transition temperature ranges from about −60° C. to about 100° C.

8. The multilayer damping laminate of claim 1, wherein the first damping layer has a first plateau modulus, wherein the second damping layer has a second plateau modulus, and wherein the damping layers of the laminate have an increasing plateau modulus profile beginning at the first damping layer.

9. The multilayer damping laminate of claim 8, wherein the ratio of the second plateau modulus to the first plateau modulus ranges from 1 to $(10(H_1/H_2)^{1.25}+10)$.

10. The multilayer damping laminate of claim 1, wherein the first damping layer has a first viscoelastic loss factor greater than $((10^{-10}/H_1^{2.5})+0.25)$, and wherein the second damping layer has a second viscoelastic loss factor greater than $((10^{-10}/H_2^{2.5})+0.25)$, wherein $H_1$ and $H_2$ each have units of meters.

11. The multilayer damping laminate of claim 10, wherein the difference between the first viscoelastic loss factor and the second viscoelastic loss factor ranges from 0.2 to 1.5 if the difference between the first glass transition temperature and the second glass transition temperature is less than about 20° C., and wherein the difference between the first viscoelastic loss factor and the second viscoelastic loss factor ranges from 0.2 to 3 if the difference between the first glass transition temperature and the second glass transition temperature is greater than about 20° C.

12. The multilayer damping laminate of claim 1, wherein the first damping layer comprises a first viscoelastic damping material and the second damping layer comprises a second viscoelastic damping material.

13. The multilayer damping laminate of claim 12, A wherein at least one of the first viscoelastic damping material and the second viscoelastic damping material comprises an adhesive.

14. The multilayer damping laminate of claim 13, wherein the adhesive is a pressure sensitive adhesive.

15. The multilayer damping laminate of claim 1, wherein the internal constraining layer and the external constraining layer each independently comprise a metal.

16. The multilayer damping laminate of claim 1, wherein the internal constraining layer and the external constraining layer are each independently a metal foil.

17. The multilayer damping laminate of claim 1, wherein the first damping layer thickness ranges from about 0.1 mil to about 200 mil.

18. The multilayer damping laminate of claim 1, wherein the second damping thickness ranges from about 0.1 mil to about 200 mil.

19. The multilayer damping laminate of claim 1, wherein the internal constraining layer and the external constraining layer each independently have a thickness ranging from about 0.2 mil to about 120 mil.

20. The multilayer damping laminate of claim 1, wherein the internal constraining layer and the external constraining layer each independently have a thickness ranging from about 2 mil to about 50 mil.

21. The multilayer damping laminate of claim 1, further comprising:
a liner layer connected to the first damping layer opposite the second damping layer.

22. A multilayer damping laminate comprising:
N damping layers, wherein N is an integer greater than or equal to 2, wherein at least a portion of each damping layer is coextensive with the other damping layers, and wherein each damping layer independently has a glass transition temperature ($T_g$) wherein $T_g(N) < T_g(N-1) < T_g(N-2) < \ldots < T_g(1)$;
N−1 internal constraining layers, wherein at least a portion of each $M^{th}$ internal constraining layer is disposed between the $M^{th}$ damping layer and the $(M+1)^{th}$ damping layer, wherein M is an integer ranging from 1 to N−1; and
an external constraining layer, wherein at least a portion of the $N^{th}$ damping layer is disposed between the $(N-1)^{th}$ constraining layer and the external constraining layer.

23. The multilayer damping laminate of claim 22, wherein each damping layer independently has a plateau modulus ($G_o$), and wherein $G_o(N) > G_o(N-1) > G_o(N-2) > \ldots > G_o(1)$.

24. A system comprising:
a base substrate; and
the multilayer damping laminate of claim 1, wherein the first damping layer is connected to the base substrate.

25. A method of reducing a vibration of a base substrate, the method comprising:
providing a base substrate that is subject to a vibration; and
connecting the first damping layer of the multilayer damping laminate of claim 1 to the base substrate, thereby reducing the vibration of the base structure.

26. The method of claim 25, further comprising:
shifting a location of maximum shear strain from the first damping layer to the second damping layer as the temperature of the multilayer damping laminate changes from the first glass transition temperature to the second glass transition temperature when measured at a frequency of interest.

27. The method of claim 26, wherein the vibration of the base structure is dissipated over a sequential range of temperatures and frequencies.

* * * * *